United States Patent
Moldenhauer

[15] 3,635,027
[45] Jan. 18, 1972

[54] ROTOR PRESTARTER AND BRAKE

[72] Inventor: Max W. Moldenhauer, 241 Rennie Avenue, Venice, Calif. 90291

[22] Filed: Dec. 22, 1969

[21] Appl. No.: 886,969

[52] U.S. Cl............................60/54, 64/26, 416/169, 416/171
[51] Int. Cl....................................F16d 31/06, F16d 33/00
[58] Field of Search..................60/54, 577, 52 B; 416/171, 416/169; 64/26

[56] References Cited

UNITED STATES PATENTS

| | | |
|---|---|---|
| 2,473,809 | 6/1949 | Miller........................................60/54 |
| 2,500,002 | 3/1950 | Miller........................................60/54 |
| 2,533,148 | 12/1950 | Spiegel......................................60/54 |
| 2,544,713 | 3/1951 | Miller........................................60/54 |

*Primary Examiner*—Edgar W. Geoghegan
*Attorney*—Robert E. Geauque

[57] ABSTRACT

An apparatus for transmitting rotational torque from a power shaft to a load shaft employing a pair of facing impellers, the impellers operating within a fluid chamber with each impeller being capable of forcing fluid into contact with the other impeller and effecting rotation thereof, a valve controlled fluid relief chamber which when open to the fluid chamber causes nontransmission of rotational torque from one impeller to the other.

6 Claims, 4 Drawing Figures

PATENTED JAN 18 1972

3,635,027

INVENTOR.
MAX W. MOLDENHAUER

BY R. E. Geauque
ATTORNEY

ROTOR PRESTARTER AND BRAKE

BACKGROUND OF THE INVENTION

The transmission of rotational torque from a power shaft to a load shaft is common in all types of engine assemblies. The most frequent type of device employed to transmit power between shafts is a clutch with the friction type of clutch being most common.

However, in the aircraft field and specifically rotor blade driven aircraft such as gyroplanes and autogyros, a complex clutching assembly is usually employed to avoid damage to the rotor system as a result of torque variations created by the engine. Clutching assemblies that are used in helicopters are required to bring the rotor speed up to engine speed after starting of the engine and to effect "free-wheeling" of the rotor upon stopping of the engine. It is necessary to "free-wheel" the rotor upon engine stoppage to avoid damage to the rotor assembly.

Heretofore, in an effort to avoid damage to the rotor assembly during startup of the rotor, a prestart motor has been employed, usually an electric motor. The purpose of the electric motor is to bring the rotor speed to approximately equal to a particular engine speed setting (usually idle speed). However, to employ an electric prestart motor has several disadvantages. First, the addition of a separate motor assembly and a separate clutching assembly which must be employed with the electric motor is not desired not only because of the additional expense but also because of the additional weight which decreases the carrying weight of the vehicle. Second, electric motors require the use of batteries to operate which is also not desired due to expense and weight. Third, a gear reduction system must be employed between the electric motor and the rotor since electric motor speeds are far too excessive. Fourth, electric motor assemblies require periodical maintenance.

It would be desirable to construct a prestart mechanism which would employ the engine of the vehicle to bring the rotor up to engine velocity, thereby preventing damage to the rotor assembly upon connection of the rotor to the engine. Also, it would be further desirable if the same mechanism could be employed to prevent the inertial "free-wheeling" of the rotor upon stoppage of the engine.

SUMMARY OF THE INVENTION

The apparatus of this invention provides for the use of a power transmitting assembly between the rotor and the engine of an aircraft vehicle separate from the main driving connection from the rotor and the engine. This invention includes a flexible shaft connecting a fluid operating impeller with the engine, a second fluid operating impeller being connected through a flexible shaft to the rotor assembly, the first and second impellers being located within a fluid chamber and each impeller being capable of moving a fluid, thereby effecting movement of the other impeller. The apparatus of this invention further includes providing a valved venting orifice to the fluid chamber of the impellers and a fluid relief chamber, which with the orifice open provides access for fluid to enter the relief chamber, thereby preventing the fluid under motion from driving an impeller.

An object of this invention not readily apparent from the foregoing is to provide a low maintenance rotor prestart and brake apparatus for the engine of a rotor vehicle.

Another object of this invention not readily apparent from the foregoing is to provide a prestart and brake apparatus which essentially makes it impossible to cause damage to the rotor system of the vehicle.

DETAILED DESCRIPTION OF THE SHOWN EMBODIMENT

Figure 1:
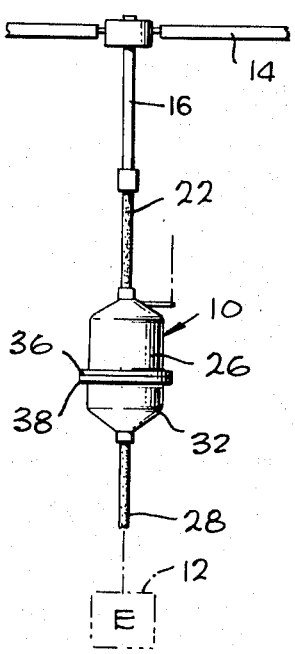
FIG. 1 is a front view of the apparatus of this invention as it would be employed between the engine and rotor of an aircraft vehicle.

Referring particularly to the drawing, there is shown in FIG. 1 the prestart and brake apparatus 10 of this invention as it would be employed between the engine 12 and rotor blade 14 of an aircraft vehicle. Rotor blade 14 is attached to a rotor shaft 16 which is rotationally secured to flexible shaft 22.

Shaft 22 is permanently secured to a first impeller 24 rotatingly mounted within outer upper housing 26. The engine 12 is connected to transmit power to a lower flexible shaft 28 which in turn is permanently affixed to a second impeller 30. Impeller 30 is rotatingly mounted within an outer lower housing 32. Impellers 24 and 30 each have a plurality of vanes 31 mounted at an angle (usually 45°) from the longitudinal axis. The direction of the vanes 31 is such that upon clockwise rotational movement of one set of impeller vanes, fluid being forced therethrough causes likewise clockwise rotational movement of the second set of impeller vanes 31. The vanes 31 of each of the impellers 24 and 30 are each mounted in a facing relationship within a fluidtight impeller housing 34. Impeller housing 34 is formed by cavities within the outer upper housing 26 and the outer lower housing 32 which are connected together to form a single structural unit. Flanges 36 and 38 of the housings 26 and 32, respectively, provide the means to connect housings 26 and 32 to form the fluidtight impeller housing 34. Bolts 40 are the fasteners employed within apertures 42 of the flanges 36 and 38 to attach together housings 26 and 32.

Located within the upper housing 26 is an annular shaped fluid relief chamber 44 which has an opening 46 leading into the impeller housing 34. A valve 48 is capable of being seated within opening 46 and preventing fluid passage between chamber 44 and housing 34. A stem 50 is connected to valve 48 with the length of the stem 50 being sufficient to extend exteriorly of the housing 26. Stem 50 includes a flange 52 which is to cooperate with a spring 54 which is housed within a recess 56 of the housing 26. Spring 54 places the stem 50 under a constant bias which tends to maintain the valve 48 seated within opening 46. Stem 50 is pivotally connected exteriorly of housing 26 to an arm 58 which is pivotally fulcrumed at 60 to housing 26. Upon manual activation of arm 58 effecting longitudinal movement of stem 50 against the bias of spring 54, the valve 48 is removed from the seated position within opening 46.

Figure 3:
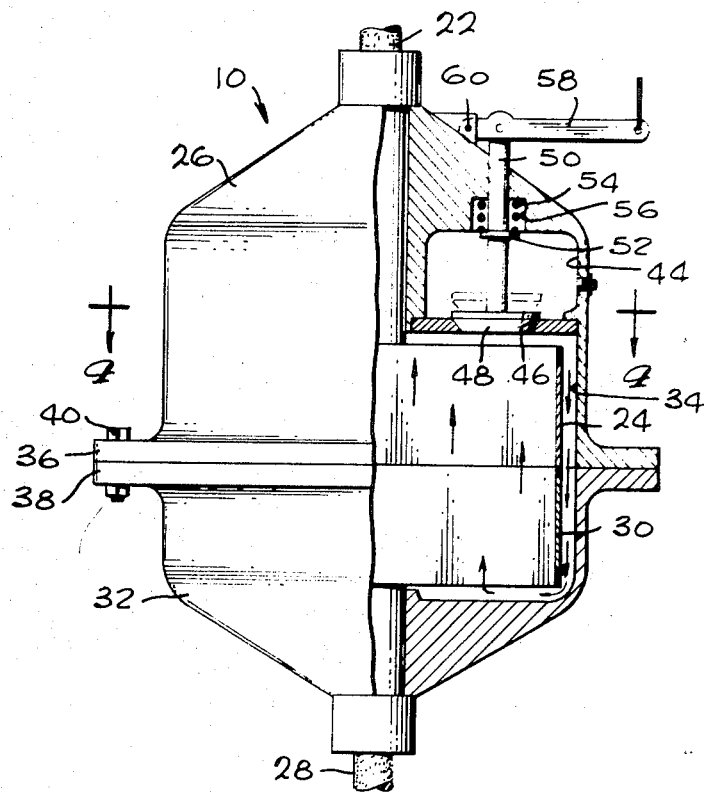
FIG. 3 is a partly in section longitudinal view of the prestart and braking apparatus of this invention.
Figure 2:
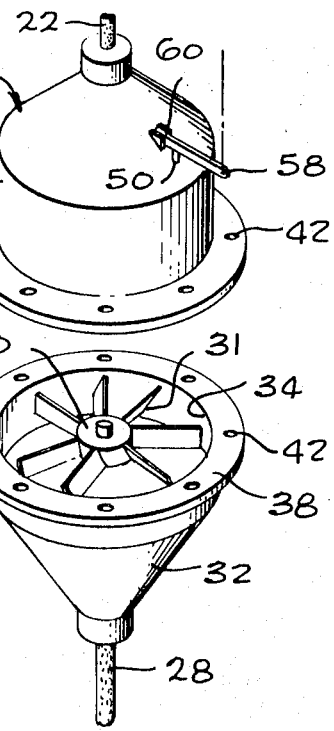
FIG. 2 is an exploded perspective view of the prestart and braking apparatus of this invention.
Figure 4:
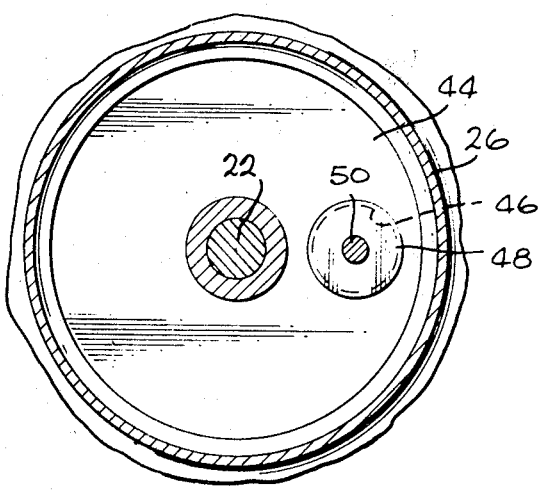
FIG. 4 is a sectional view taken along line 4—4 of FIG. 3 showing in more detail the valving assembly included within this invention.

The operation of the prestart and brake apparatus 10 of this invention is as follows: To employ the apparatus 10 as a prestarter, prior to starting of engine 12, the valve 48 is permitted to move to the seated position under urgence of spring 54 and due to gravity all fluid has passed from chamber 44 into impeller housing 34. Upon starting of engine 12 impeller 30 is caused to rotate. Fluid (such as an oil) is moved by the vanes 31 of impeller 30 into contact with the vanes 31 of impeller 24 which results in like rotational movement of impeller 24. Shaft 22 is thereupon rotated and likewise shaft 16 of rotor blade 14. The fluid passage within impeller housing 34 is depicted by arrows in FIG. 3 of the drawing. AFter the fluid passes through the vanes 31 of the impeller 24, it is conducted through an annular passage provided between the outer diameter of the impellers and the inner diameter of the impeller housing 34 back to the lower side of the impeller 30 to be again forcibly conducted through the vanes 31 of the impeller 24. The one principal advantage of this apparatus 10 in prestarting is that due to the fluid power connection, any sudden surges of power from the engine are damped and are not transmitted to the rotor blade with sufficient intensity to damage the rotor blade assembly. Upon the engine 12 achieving take off rotor r.p.m., the arm 58 is activated and valve 48 is unseated thereby causing the power transmitting fluid to flow into chamber 44. As a result, impeller 24 discontinues transmitting rotational torque to rotor blade 14. It is to be noted that although power is not being transmitted from impeller 30 to impeller 24, impeller 30 continues to rotate due to being directly connected to the engine 12.

To employ apparatus 10 as a brake it will be assumed that the vehicle has just landed and engine 12 shut off. Rotor blade 14 continues to rotate due to inertia. Because impeller 30 is not longer rotating, the fluid passes from chamber 44 into the impeller housing 34 by gravity if valve 48 is off its seat. Valve 48 is then seated upon opening 46. Fluid is caused to pass from vanes 31 of impeller 24 to contact vanes 31 of impeller 30 thereby attempting to cause rotation of impeller 30. Since impeller 30 is directly connected to engine 12 and engine 12 is stopped, fluid friction results between impellers 24 and 30 which slowly stops rotor blade 14.

I claim:

1. A prestart and braking apparatus to be employed to transmit rotational torque comprising:
   a first rotatable impeller having a plurality of angular vanes capable of causing fluid movement;
   a second rotatable impeller having a plurality of angular vanes capable of causing fluid movement, said first and second impellers being located in a fluidtight housing;
   a power transmitting fluid capable of being conducted from the vanes of the first impeller to the vanes of the second impeller and thereafter being conductable through a passage back to the first impeller, said fluid after being moved from said first impeller causing rotational movement of said second impeller; and
   a fluid relief chamber located adjacent said fluid tight housing capable of holding a portion of said power transmitting fluid which flows from said fluidtight housing, a valve controlling the flow of fluid to and from said fluidtight housing.

2. An apparatus as defined in claim 1 wherein:
said passage is substantially annular and located exteriorly of said impellers but interiorly of said fluidtight housing.

3. An apparatus as defined in claim 2 wherein:
said valve is under constant bias to a position which prevents fluid flow between said fluidtight housing and said fluid relief chamber, said valve being capable of being moved against said bias to permit fluid flow between said fluid relief chamber and said fluidtight housing.

4. An apparatus as defined in claim 3 wherein:
said fluid comprises a liquid.

5. An apparatus as defined in claim 3 wherein:
said prestart and braking apparatus is employed between the rotor blade and engine of an aircraft vehicle.

6. An apparatus as defined in claim 5 wherein:
there is a primary drive and an auxiliary drive for said rotor blade from said engine of said vehicle, said apparatus being employed within said auxiliary drive.

* * * * *